Dec. 14, 1948.  R. P. CARUSO  2,456,254
FISHING RIG
Filed March 8, 1946
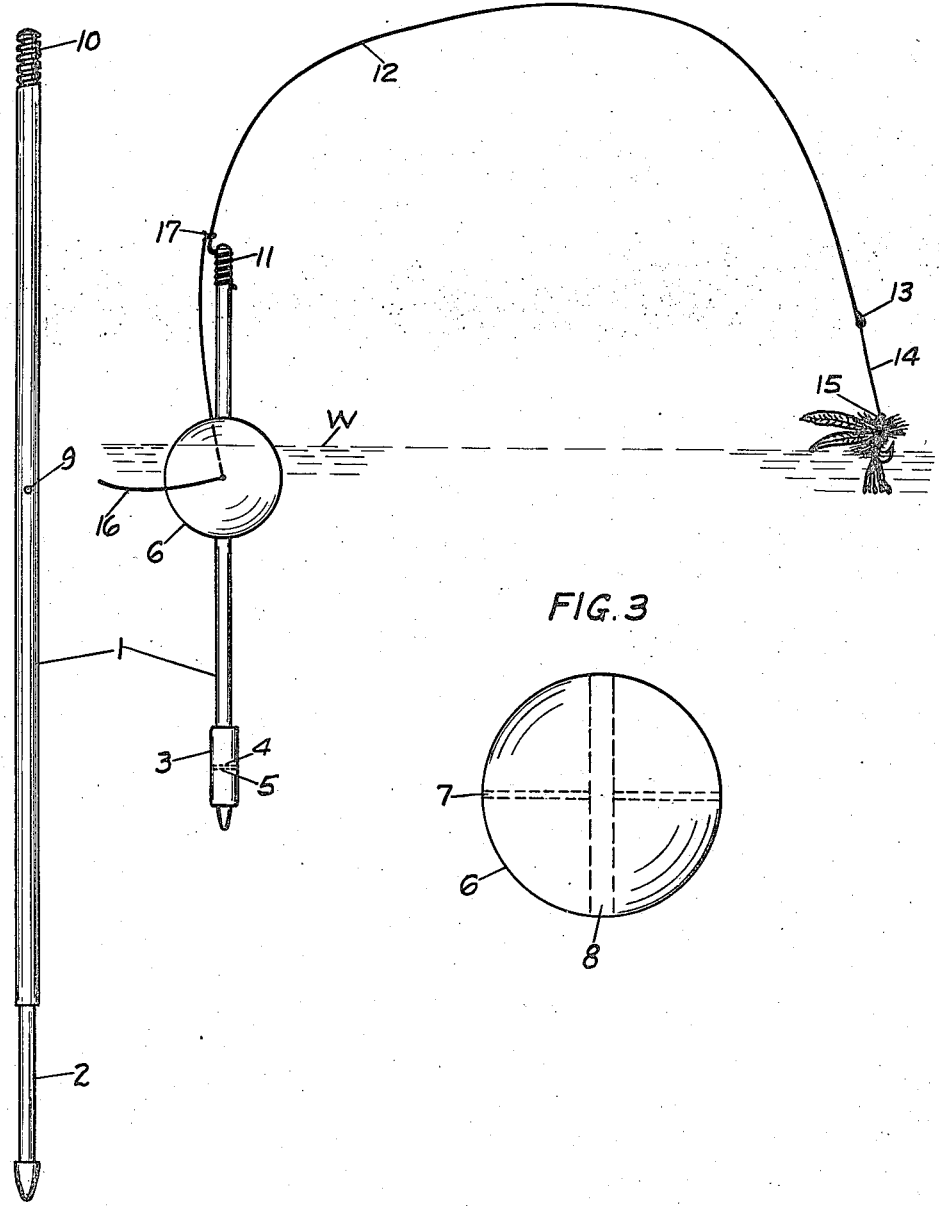
INVENTOR.
ROCCO P. CARUSO
BY A. D. T. Libby
Attorney Patented Dec. 14, 1948

2,456,254

UNITED STATES PATENT OFFICE 2,456,254

FISHING RIG

Rocco Paul Caruso, Newark, N. J., assignor of forty-five per cent to Russell W. Smith, Arlington, N. J., and ten per cent to A. D. T. Libby Application March 8, 1946, Serial No. 652,987

6 Claims. (Cl. 43—4)

This invention relates to a fishing rig especially adapted for use in fresh water fishing. It is the principal object of my invention to provide a fishing rig which automatically acts to move the lures, such as artificial flies, in such a manner as to closely imitate the natural movement of real flies along or above the surface of the water.

Another object of my invention is to provide a fishing rig which will imitate action of natural flies on or above the surface of the water in such a manner so as to produce for a novice or poor fisherman the actions produced by an expert fisherman in the movement of an ordinary or usual type of fishing apparatus.

Another object of my invention is to provide a fishing rig which may be readily adjusted for use by an inexperienced person. These and other objects will be readily understood by an expert fisherman from a reading of the following specification taken in connection with the annexed drawing wherein:

Figure 1 is a full-size view of one of the parts of my improved fishing rig.

Figure 2 is a view on a somewhat reduced scale of a completely assembled rig as it would appear in the water.

Figure 3 is an enlarged view of the float shown in Figure 2.

In the various views wherein like numbers refer to corresponding parts 1 is a pin, or what I may term a dowel, of suitable material such as wood preferably treated to make it waterproof. The pin at one end, which may be termed the water end, has a portion 2 of reduced cross section and in this reduced portion a ballast or sinker 3 is positioned. For this ballast or sinker I prefer to use a thin strip of lead which may be quickly wrapped around the portion 2. The strip 3 may be in two parts as indicated by the broken lines 4 and 5 in Figure 2 whereby the weight of the ballast or sinker may be easily and quickly adjusted to get the right amount of weight for cooperation with the float 6 of suitable material such as cork or balsa. The float 6 is positioned on the pin intermediate its ends. The float 6 has a hole 7 therethrough preferably positioned on a horizontal diameter of the float. The float also has a vertical hole 8 therethrough to receive the pin 1 which is provided with a hole 9 adapted to cooperate with the hole 7 in the float 6. The pin at its opposite end which may be termed the air end, is provided with a spiral groove 10 to receive closely fitting spiral turns 11 of a wire 12 of suitable spring material such as beryllium copper or steel properly tempered and treated with a rust-proof material. The free or open end 13 of the wire 12 is provided with a loop to which is attached a gut generally referred to as a snell 14 to which is fastened a lure 15 that may be found satisfactory for the kind of fish and type of natural flies that may be skimming around or above the surface of the water on the particular day that the rig is used. The fish line 16 going to the pole or reel passes through the hole 7 in the float 6 and also through the hole 9 in the pin 1 and is preferably fastened at 17 to the wire 12 closely adjacent the air end of the pin 1. I prefer this point of attachment so that if for any reason the convolutions 11 of the wire 12 become detached from the pin 1 it will not be lost because the knot 17 will not pass the spirals 11 in the wire 12.

As shown in Figure 2 the fishing rig is indicated as in fishing position with the float 6 in the water W and the lure 15 at one position which it may occupy. As the water may ripple or undulate, the float 6 will bob up and down and this motion is transmitted through the spring wire 12 to the lure 15 causing it to dance on the water or to simulate the motion of a natural fly on or above the water's surface. Because of the construction shown and described the pin or dowel 1 will stay substantially in an upright position which will permit the lure to rise and fall responsive to the movement of the float 6 and parts attached thereto. From the description it will be readily seen that the rig is very easily adjustable to meet varying conditions of the water wherein fishing is being carried out.

Having thus described my invention, what I claim is:

1. In combination with a fish line, a rig including a pin, a weight on one end of the pin, a spring wire attached to the other end of the pin, a float carried by the pin intermediate its ends, and a snell carrying a lure attached to the free end of said wire, the fish line being preferably attached to the wire at the end of the pin.

2. In combination with a fish line, a rig including a pin, a weight on one end of the pin, a wire of suitable spring material attached to the opposite end of the pin, a snell carrying a lure attached to the free end of said wire, and a float of suitable material positioned intermediate the ends of the pin, the pin having a transverse hole therethrough, the float having a hole therethrough to cooperate with the hole in the pin to receive the fish line which is adapted to be attached to the wire near where the wire is attached to the pin.

3. In combination with a fish line, a rig including a pin having a transverse hole and having a readily variable weight directly on one end, a wire of spring material attached to the opposite end of the pin, a snell carrying a lure attached to the free end of said wire, and a float positioned in relatively fixed position intermediate the ends of the pin and having an axial hole therein, said position being determined by said transverse hole in the pin and the axial hole in the float whereby the fish line can be passed through both holes and fastened to the wire end of the pin.

4. A fishing rig comprising a pin having a portion at one end for attachment of a ballast which may be readily varied in weight and also having means at its opposite end for the attachment of a spring wire, a spring wire attached to said opposite end of the pin, a catching device attached to the free end of the wire, and a float carried by the pin, both the pin and float having cooperative holes therein for the passage of a fish line the end of which is to be attached to the spring wire near where the wire is attached to the pin.

5. A fishing rig comprising a pin having a portion at one end of reduced cross section while the opposite end of the pin has a spiral groove therein, a wire of suitable spring material having one end formed to snugly fit said groove in the pin, a snell carrying a lure attached to the free end of the wire, a band type ballast adapted to be wound on said reduced portion of the pin, and a float carried by the pin, both the pin and float having cooperative holes therein for the passage of a fish line the end of which is adapted to be attached to the spring wire near where the wire is attached to the pin.

6. A fishing rig comprising a pin having an adjustable ballast directly on one end and means at the other end for detachably fastening a wire thereto, a wire of springy material having an end formed to cooperate with said means to hold the wire on the pin, the free end of said wire having a snell carrying a lure attached thereto, and a float carried by the pin and held in position thereon by a fish line adapted to be passed through the float and pin and attached to the wire adjacent said formed end.

ROCCO PAUL CARUSO.

REFERENCES CITED

The following references are of record in the file of this patent:

UNITED STATES PATENTS

| Number | Name | Date |
|---|---|---|
| 510,205 | Stiner | Dec. 5, 1893 |
| 608,063 | Mintzer | July 26, 1898 |
| 657,407 | Gibson | Sept. 4, 1900 |
| 1,792,989 | LaGue | Feb. 17, 1931 |
| 2,122,836 | Gegerfeldt | July 5, 1938 |

FOREIGN PATENTS

| Number | Country | Date |
|---|---|---|
| 109,120 | Australia | Nov. 30, 1939 |